(12) United States Patent  (10) Patent No.: US 9,122,541 B2
Brazier  (45) Date of Patent: *Sep. 1, 2015

(54) SYSTEM AND METHOD FOR THREAD PROTECTED TESTING

(71) Applicant: Siemens Product Lifecycle Management Software Inc., Plano, TX (US)

(72) Inventor: Mark Brazier, Cambridge (GB)

(73) Assignee: Siemens Product Lifecycle Management Software Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/175,404

(22) Filed: Feb. 7, 2014

(65) Prior Publication Data

US 2014/0157286 A1 Jun. 5, 2014

Related U.S. Application Data

(63) Continuation of application No. 13/087,554, filed on Apr. 15, 2011, now Pat. No. 8,695,013.

(51) Int. Cl.
*G06F 9/46* (2006.01)
*G06F 9/52* (2006.01)
*G06F 9/48* (2006.01)

(52) U.S. Cl.
CPC ............... *G06F 9/52* (2013.01); *G06F 9/4881* (2013.01); *G06F 2209/484* (2013.01)

(58) Field of Classification Search
CPC ........................................................ G06F 9/52
See application file for complete search history.

(56) References Cited

U.S. PATENT DOCUMENTS

| 7,823,170 | B2 | 10/2010 | Jolfaei et al. | |
|---|---|---|---|---|
| 7,865,911 | B2* | 1/2011 | Lin et al. | 719/328 |
| 7,984,332 | B2* | 7/2011 | Yang et al. | 714/31 |
| 8,286,196 | B2 | 10/2012 | Munshi et al. | |
| 2005/0125508 | A1* | 6/2005 | Smith et al. | 709/220 |
| 2007/0130574 | A1* | 6/2007 | Gokhale et al. | 719/330 |
| 2007/0240114 | A1 | 10/2007 | Dallman | |
| 2010/0281464 | A1* | 11/2010 | Vajapeyam | 717/119 |
| 2011/0145844 | A1* | 6/2011 | Shafi et al. | 719/330 |

\* cited by examiner

*Primary Examiner* — Emerson Puente
*Assistant Examiner* — Charlie Sun

(57) ABSTRACT

A method performed by a system including one or more data processing systems. The method includes receiving a plurality of requesting process calls for a target process from one or more requesting processes and identifying dependencies between the requesting process calls. The method includes sending the requesting process call to the target process for execution on multiple threads, including sending thread execution parameters corresponding to the requesting process calls, the thread execution parameters indicating that the requesting process calls can be executed by the target process simultaneously and independently, that the requesting process calls must be processed in a specific order based on the dependencies, or that the requesting process calls are to be executed with shared process objects. The method includes receiving results from the target process. The method includes sending the results to the requesting processes corresponding to the respective requesting process calls.

20 Claims, 3 Drawing Sheets

SYSTEM AND METHOD FOR THREAD PROTECTED TESTING

CROSS-REFERENCE TO RELATED APPLICATION

This application is a continuation of U.S. patent application Ser. No. 13/087,554, filed Apr. 15, 2011, which is hereby incorporated by reference.

TECHNICAL FIELD

The present disclosure is directed, in general, to microprocessor operations.

BACKGROUND OF THE DISCLOSURE

Data processing systems use one or more processors, each of which may include one or more processor cores. Applications and operating systems running on these processors may use multiple threads for execution.

SUMMARY OF THE DISCLOSURE

Various embodiments include methods and corresponding systems and computer-readable mediums. A method includes receiving a plurality of requesting process calls for a target process from one or more requesting processes, and identifying dependencies between the requesting process calls. The method includes sending the requesting process call to the target process for execution on multiple threads, based on the identified dependencies, including sending thread execution parameters corresponding to the requesting process calls, the thread execution parameters indicating that (i) the requesting process calls can be executed by the target process simultaneously and independently, (ii) that the requesting process calls must be processed in a specific order based on the dependencies, or (iii) that the requesting process calls are to be executed with shared process objects. The method includes receiving results, corresponding to the requesting process calls, from the target process. The method includes sending the results to the requesting processes corresponding to the respective requesting process calls.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
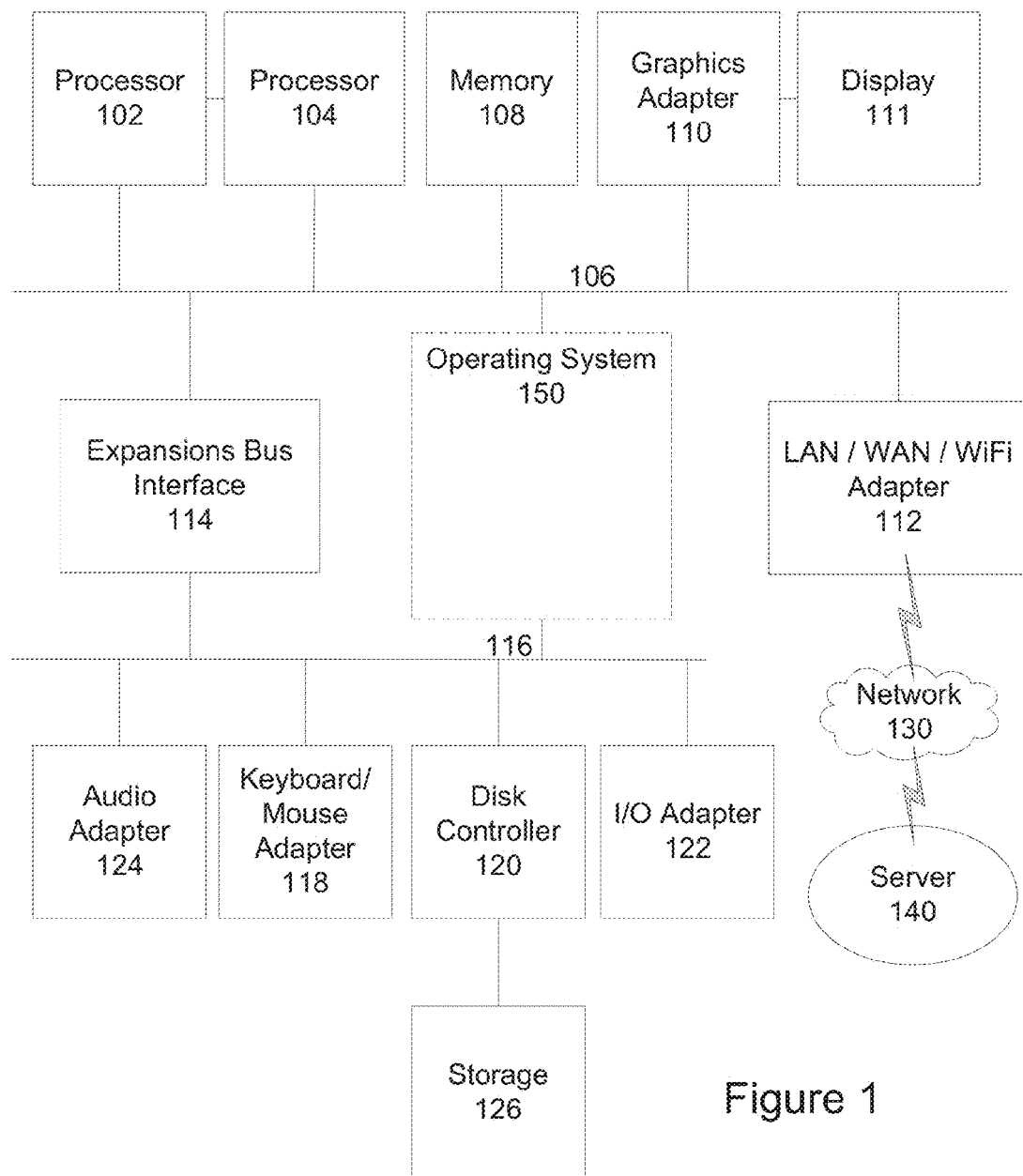
FIG. 1 depicts a block diagram of a data processing system in accordance with disclosed embodiments.
Figure 2:
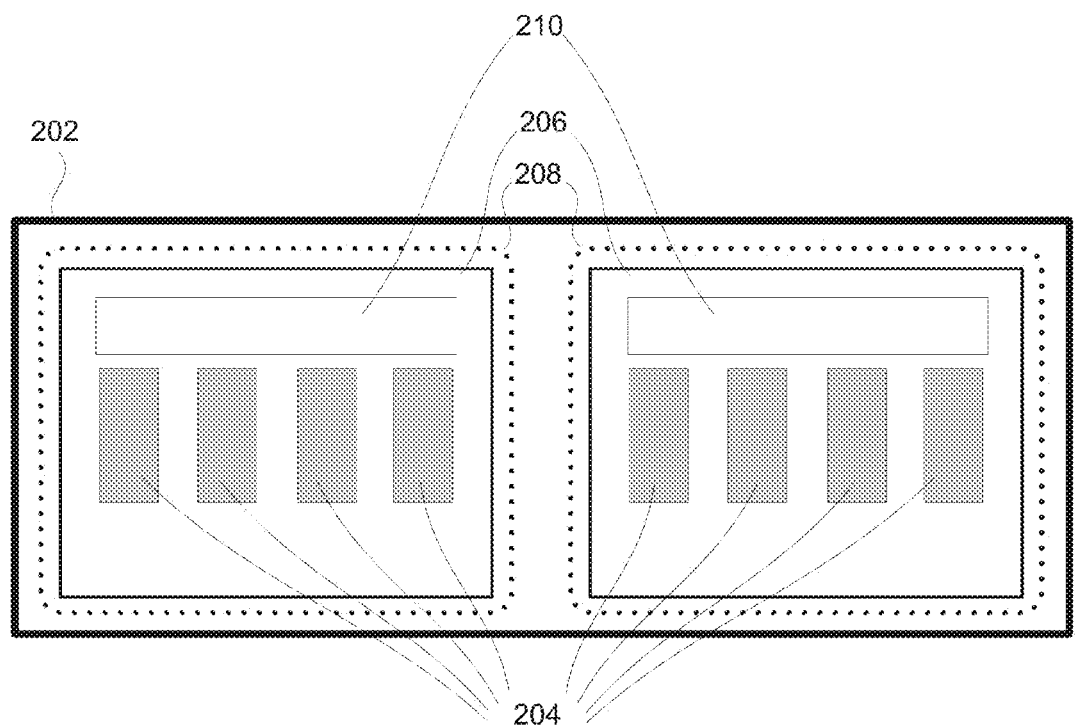
FIG. 2 depicts a simplified block diagram of a multiprocessor that can be used in accordance with disclosed embodiments.
Figure 3:
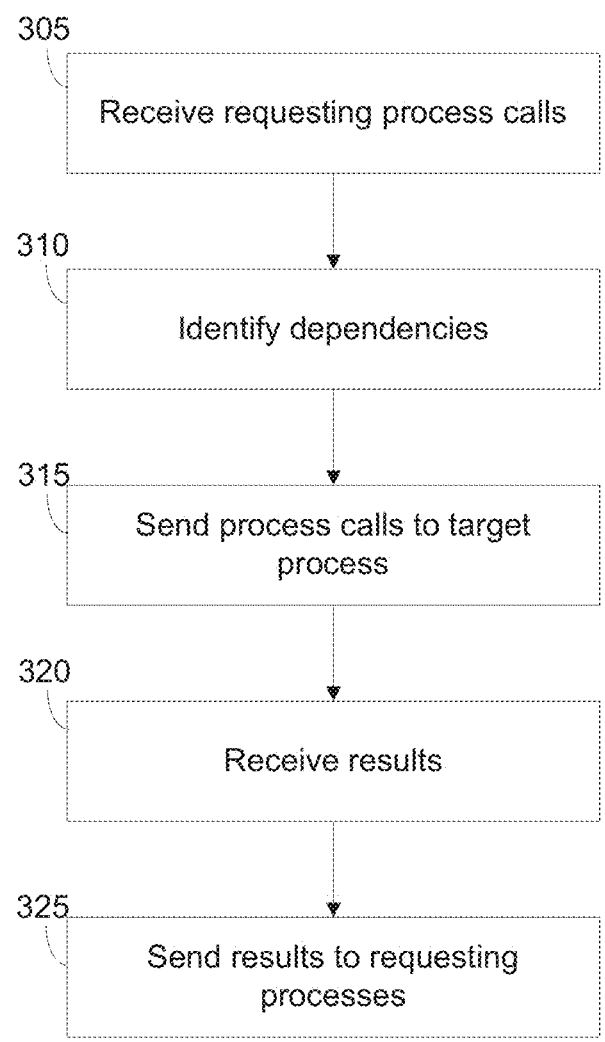
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Computers with multiple processors have existed for many years, while computers with multi-core processors are relatively new. One known approach to programming computers with multiple processors is symmetric multi-processing (SMP). This term is not quite accurate for computers with more than one multi-core processor, for which the term "Not Quite SMP" (NQSMP) has been coined, an example of which is described below. Simultaneous multi-threading (SMT) is another approach to application execution in these systems, and these various approaches in programming and in the ways that memory is connected to processors have made it difficult for applications to consistently extract the maximum performance from recent computer designs.

Following are short descriptions of the usual meanings of some of the technical terms which are used in the present application; however, those of ordinary skill will recognize whether the context requires a different meaning Additional definitions can be found in the standard technical dictionaries and journals.

A processor core is what used to be thought of as a complete processor: a collection of circuits that fetches instructions from memory and executes them. It normally includes registers, and several execution units. Types of execution units include the arithmetic logic unit (ALU), the floating-point unit (FPU) for arithmetic on floating-point numbers, and in some cores, other types of units, such as a specialised unit for branch instructions, or a cryptographic unit for rapid encryption and decryption of data. Some cores contain multiple execution units of the same type, which can give improved performance provided that the core can make proper use of them.

Cores also contain processor cache. Because modern processors run at very high speeds, and low-cost, high-capacity computer memory is not fast enough for them, small amounts of very high-speed memory are built into a processor, and used to store recently-used data, which is likely to be required again. This improves the overall performance of modern computers considerably.

Some cores run a single hardware thread, but others can run two or more hardware threads at the same time. This is called "simultaneous multi-threading", or SMT. Such a core contains more than one set of registers, and can execute more than one instruction stream at the same time. However, the core's execution units are shared amongst the hardware threads in some manner. If the hardware threads had entirely separate sets of execution units, they would be separate cores, rather than hardware threads.

Modern programs are run as one or more application threads. By default, a program has one application thread, but modern programming environments allow the programmer to create additional application threads, and provide facilities for data locking, to control application thread's access to the programs data.

A memory bus connects a socket to the computer's main memory, or part of it. Some computers with multiple sockets connect the same memory bus to all of them; others have separate memory busses for each socket. The first technique is simpler, but the second allows for the separate busses to be used simultaneously, increasing the amount of data that can be accessed per second. Other systems have multiple memory busses per socket. This allows for enough memory access to feed many cores, improving performance, but doesn't change the basic idea.

An operating system is a "master control program", which controls the running of application programs on its computer. Modern operating systems are quite flexible, and a single version of an operating system is capable of running on many different configurations of hardware, adapting itself to suit them. It tries to provide a standardized environment to programs, which can in some ways limit their ability to take best advantage of the hardware.

Many processors use multiple cores and multiple threads on those cores. Some applications, particularly older or "legacy" applications, may not be designed to operate in environments with multiple threads, multiple processors, or with processors with multiple cores. These "non-thread-safe" applications may be unstable or introduce conflicts, particularly when they attempt to call or reference a "thread-safe" application that is designed to operate in multi-thread, multi-processor, or multi-core environments. In some cases, non-thread safe software may execute on multi thread systems, but because the process can only use one thread, it runs as slowly as on a single core/processor system. This may be slower than on a powerful single core/processor system.

In other cases, non-thread-safe applications may call several application programming interfaces (APIs), from several different suppliers, which may each change from non-thread-safe to thread safe over time. It is therefore useful to be able to effectively and safely manage each of these cases, or combinations of these cases, by employing Intermediate Layers as necessary to optimized performance on an API by API basis. Various embodiments disclosed herein include techniques that enable a non-thread-safe application to call a thread-safe API in order to gain the performance benefits of running the thread-safe API on multi-processor or multi-core processor computer hardware.

FIG. 1 depicts a block diagram of a data processing system in accordance with disclosed embodiments. The data processing system depicted includes one or more processors 102/104, connected directly or indirectly to a local system bus 106, and each of processors 102/104 can include one or more processor cores, caches, and other processor components known to those of skill in the art and described herein, including one or more dies or sockets. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network (WAN)/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives, flash drives, solid state drives, and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

While not a physical element of data processing system 100, for clarity of description, operating system 150 is shown here in communication with local system bus 106 and I/O bus 116. Those of skill in the art will recognize that the operating system 150 is stored in either or both of memory 108 and storage 106, and executes on processors 102/104. Operating system 150 controls processor use and thread allocation as described in more detail below, among other tasks known to those of skill in the art. One of various commercial operating systems, such as one of the the Unix/Linux family of operating systems, with or without a POSIX API, or a version of Microsoft Windows™, a product of Microsoft Corporation located in Redmond, Wash. may be employed if suitably modified as described herein. The operating system is modified or created in accordance with the present disclosure as described. The operating system can instrospect the hardware of the data processing system to determine the structure and number of processors 102/104 and their respective cores, along with other hardware configuration information, using techniques known to those of skill in the art.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

FIG. 2 depicts a simplified block diagram of a multiprocessor 202 that can be used in accordance with disclosed embodiments, for example as processors 102/104 in FIG. 1. In this example, multiprocessor 202 includes four cores 204 on each die 206 in each of two sockets 208. Such a processor can have separate memory busses, multiple speeds and an NQSMP capability; assume in this example that each processor has four cores, which share an outermost level of cache 210. Each core 204 may also have its own cache. Each processor also has a separate memory bus, although the processors can access the memory of other processors. Of course, those of skill in the art will recognize that the techniques disclosed herein apply as well to other multiprocessor or multiple-core architectures. In general a system with both multiple cores per die, and multiple dies or sockets, will be an NQSMP system rather than an SMP system.

In disclosed embodiments, it is desirable for an operating system, such as operating system 150, to be able to choose a combination of cores for a program that is multi-threaded to gain more access to CPU power, which will suit the characteristics of the program, within the limitations of the hardware and the other programs running at the same time.

When a thread is created, a conventional operating system has little information about a process when executing the thread. The operating system doesn't know if this is a thread created for program structure reasons, or to access more CPU power. The operating system doesn't know how frequently threads will want to use locks, or how much memory bandwidth they will need. In conventional cases, a non-thread-safe application may not be able to function correctly in such an environment, or may not be able to correctly interact with other thread-safe applications. The universal availability of multi-processor or multi-core processor computer hardware requires applications to use multi-thread techniques to remain commercially competitive in performance terms.

Modifying a single-thread application into an efficient thread-safe application is a major task, where this is possible. This is generally not possible if the application is coded in an inherently non-thread-safe programming language such as LISP.

Reliability of computer-aided design, manufacturing, engineering, modeling, and visualization systems (individually and collectively, "CAD" and "CAD systems"), product lifecycle management ("PLM") system, and other systems, is often tested using a "test harness", as known to those of skill in the art. Development applications such as a test harness also need to be enhanced to allow effective testing of the thread-safe API as it is called in both multiple-thread and single-thread operation modes. The quantity of test data and test routines for an API can be huge, and re-authoring all the tests can be prohibitively expensive.

One specific advantage of the embodiments disclosed herein is that the significant investment in existing non-thread-safe application code and supporting data can be employed without modification, to take advantage of the performance benefits of thread-safe version of an API it calls.

Various embodiments include processes for passing the API function calls made by the non-thread-safe application through an Intermediate Layer of code to the thread-safe API and passing results from the thread-safe API through the Intermediate Layer to the non-thread-safe application.

According to various embodiments, the Intermediate Layer can collect a set of function calls from a non-thread-safe application and create an additional application thread for each function call. The system can present these to the thread-safe API as multiple external threads which are performed and interleaved simultaneously.

According to various embodiments, the system can return a set of results from the thread-safe API's multiple threads via the Intermediate Layer to the non-thread-safe application. This is done in such a way that each result can be matched with the corresponding one of the original set of function calls made by the non-thread-safe application to the thread-safe API. One effect is the ability to exercise the API's correct usage of "exclusive" and "concurrent" thread locking from a non-thread-safe application employing code written in an inherently non-thread-safe programming language. The term "inherently non-thread-safe," as used herein, can indicate that sometimes there is simply no practical way of making the calling application thread-safe. In these cases, disclosed embodiments enable operations that were previously unavailable, e.g., when coding in the LISP language. Using techniques disclosed herein, non-thread-safe applications can also be exploited without the cost and expense of converting the calling application to a thread-safe form, assuming it is possible to do so.

Another specific advantage of disclosed embodiments is that the conversion in the Intermediate Layer between single-thread processes and multiple-thread processes in each direction does not create significant performance overhead. This ensures that for a sequence of API function calls that require few processor cycles, there is virtually no observable performance degradation when comparing the non-thread-safe application calling the API in single-thread mode or in multi-thread mode via the Intermediate Layer.

In various embodiments, multiple application threads can call the same application, using the Intermediate Layer, without requiring the system to perform external locking on the target application.

FIG. 3 depicts a flowchart of a process in accordance with disclosed embodiments. Note that, as understood to those of skill in the art, where a step is described as performed by an operating system or application, it may be understood as being performed by the data processing system itself under the control of the operating system or application, as a particular machine configured to perform or execute similar steps. The processes of FIG. 3 can be performed by a single data processing system 100, or by multiple data processing systems 100 acting together. "Receiving," as used herein, can include receiving from another data processing system, such as over a network, loading from storage, receiving from another process on the same or a different data processing system, or receiving from a user, unless specifically indicated otherwise, and "sending" or "transmitting" is the converse of "receiving".

The system receives a plurality of requesting process calls each for the same target process (step 305). The requesting process calls, in various embodiments, can be from separate requesting processes, on the same or different system, or can be calls from the same requesting process in different process threads. In particular, these requesting process calls can be simultaneous or sequential process call from a non-thread-safe process that is calling a thread-safe process. According to various embodiments, these requesting process calls are received by an Intermediate Layer API to a thread-safe target process. In various embodiments, one or more of the requesting processes operate as a test harness to test one or more instances of the thread-safe target process.

The system identifies any dependencies between the requesting process calls (step 310). In particular, this can include identifying when the results of a first requesting process call is needed for proper execution of a second requesting process call, and when a first process call uses the same environment variables or other process objects as a second process call such that the first and second process calls should share process objects. In various embodiments, this identification is performed by the Intermediate Layer API.

Based on this identification, the system sends the requesting process calls to the target process for execution on multiple threads (step 315). In many cases, this will include sending thread execution parameters corresponding to the requesting process calls, that indicate that the request process calls can be executed by the target process simultaneously and independently, that various of the request process calls must be processed in a specific order based on the dependencies, that various of the request process calls are to be executed with shared process objects, or various combinations of these. The target process executes the requesting process calls according to the thread execution parameters, in various embodiments.

The system receives process results from the target process (step 320). These process results correspond to one or more of the request process calls.

The system sends the process results to the requesting processes corresponding to the respective requesting process calls (step 325). In some embodiments, these process results are test results returned to the test harness.

In some embodiments, dependency is handled by "nesting" the calls. For example, the system can set up each application thread for each API function call as appearing inside; the previous call to the non-thread-safe application. In that way, there is not an inherent dependency between the requesting process calls, and the system can effectively force an artificial dependency to get every requesting process call to start before any ends. For example, three functions f1( )|f2( )|f3( ) that are processed in parallel to the thread-safe application can be processed as f1(f2(f3( ))) by the non-thread-safe application. Using such a technique can ensure, such as in step 315 above, that by the time the system executes each requesting process call on the target process, there are no dependencies between them imposed from the requesting processes.

Various embodiments can test any combinations of multiple thread-safe API application calls as though the application explicitly created multiple threads and instructed each to call an independent API function with independent arguments. The thread-safe API under test can then ensure that any dependencies between the API functions themselves are resolved, e.g., one API function waits until another has finished.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). Various embodiments include one or more data processing systems configured to perform processes as described herein, and transitory and non-transitory machine-readable mediums that comprise instructions that, when executed, cause one or more data processing systems to perform process as described herein.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a system including one or more data processing systems, comprising:
receiving a plurality of requesting process calls for a target process from one or more requesting processes;
identifying dependencies between the plurality of requesting process calls;
sending the plurality of requesting process calls to the target process for execution on multiple threads, based on the identified dependencies, including sending thread execution parameters corresponding to the plurality of requesting process calls, the thread execution parameters indicating (i) that the plurality of requesting process calls can be executed by the target process simultaneously and independently, (ii) that the plurality of requesting process calls must be processed in a specific order based on the dependencies, or (iii) that the plurality of requesting process calls are to be executed with shared process objects;
receiving results, corresponding to the plurality of requesting process calls, from the target process; and
sending the results to the one or more requesting processes corresponding to the respective requesting process calls.

2. The method of claim 1, wherein the one or more requesting processes are non-thread-safe process and the target process is a thread-safe process.

3. The method of claim 1, wherein identifying dependencies includes identifying when the results of a first requesting process call is needed for proper execution of a second requesting process call.

4. The method of claim 1, wherein identifying dependencies includes identifying when a first requesting process call and a second requesting process call should share process objects.

5. The method of claim 1, wherein target process executes the plurality of requesting process calls according to the thread execution parameters.

6. The method of claim 1, wherein the one or more requesting processes act as a test harness for the target process.

7. The method of claim 6, wherein the results are test results from the target process.

8. At least one data processing system, each data processing system comprising:
   a memory; and
   one or more processors, each processor having one or more cores, the at least one data processing system configured to execute the steps of:
   receiving a plurality of requesting process calls for a target process from one or more requesting processes;
   identifying dependencies between the plurality of requesting process calls;
   sending the requesting process call to the target process for execution on multiple threads, based on the identified dependencies, including sending thread execution parameters corresponding to the plurality of requesting process calls, the thread execution parameters indicating (i) that the plurality of requesting process calls can be executed by the target process simultaneously and independently, (ii) that the plurality of requesting process calls must be processed in a specific order based on the dependencies, or (iii) that the plurality of requesting process calls are to be executed with shared process objects;
   receiving results, corresponding to the plurality of requesting process calls, from the target process; and
   sending the results to the one or more requesting processes corresponding to the respective requesting process calls.

9. The at least one data processing system of claim 8, wherein the one or more requesting processes are non-thread-safe process and the target process is a thread-safe process.

10. The at least one data processing system of claim 8, wherein identifying dependencies includes identifying when the results of a first requesting process call is needed for proper execution of a second requesting process call.

11. The at least one data processing system of claim 8, wherein identifying dependencies includes identifying when a first requesting process call and a second requesting process call should share process objects.

12. The at least one data processing system of claim 8, wherein target process executes the plurality of requesting process calls according to the thread execution parameters.

13. The at least one data processing system of claim 8, wherein the one or more requesting processes act as a test harness for the target process.

14. The at least one data processing system of claim 13, wherein the results are test results from the target process.

15. A non-transitory computer readable medium encoded with executable instructions that, when executed, cause one or more data processing systems to perform the steps of:
   receiving a plurality of requesting process calls for a target process from one or more requesting processes;
   identifying dependencies between the plurality of requesting process calls;
   sending the requesting process call to the target process for execution on multiple threads, based on the identified dependencies, including sending thread execution parameters corresponding to the plurality of requesting process calls, the thread execution parameters indicating (i) that the plurality of requesting process calls can be executed by the target process simultaneously and independently, (ii) that the plurality of requesting process calls must be processed in a specific order based on the dependencies, or (iii) that the plurality of requesting process calls are to be executed with shared process objects;
   receiving results, corresponding to the plurality of requesting process calls, from the target process; and
   sending the results to the one or more requesting processes corresponding to the respective requesting process calls.

16. The non-transitory computer-readable medium of claim 15, wherein the one or more requesting processes are non-thread-safe process and the target process is a thread-safe process.

17. The non-transitory computer-readable medium of claim 15, wherein identifying dependencies includes identifying when the results of a first requesting process call is needed for proper execution of a second requesting process call.

18. The non-transitory computer-readable medium of claim 15, wherein identifying dependencies includes identifying when a first requesting process call and a second requesting process call should share process objects.

19. The non-transitory computer-readable medium of claim 15, wherein target process executes the plurality of requesting process calls according to the thread execution parameters.

20. The non-transitory computer-readable medium of claim 15, wherein the one or more requesting processes act as a test harness for the target process and the results are test results from the target process.

* * * * *